United States Patent [19]

Buchanan et al.

[11] Patent Number: 4,978,441
[45] Date of Patent: Dec. 18, 1990

[54] LABORATORY FCC RISER AND PARTICULATE DELIVERY SYSTEM THEREFOR

[75] Inventors: John S. Buchanan, Hamilton Square; Hans J. Schoennagel, Pennington, both of N.J.

[73] Assignee: Mobil Oil Corp., Fairfax, Va.

[21] Appl. No.: 219,122

[22] Filed: Jul. 15, 1988

[51] Int. Cl.$^5$ ............................................. C10G 11/00
[52] U.S. Cl. .................................... 208/113; 208/146; 208/152; 208/153; 208/164; 208/174; 422/139; 422/144; 422/145; 422/147
[58] Field of Search ............... 208/113, 146, 152, 153, 208/164, 174; 422/139, 145, 147, 144

[56] References Cited

U.S. PATENT DOCUMENTS

| | | | |
|---|---|---|---|
| 2,697,685 | 12/1954 | Fahnestock et al. | 208/174 |
| 2,856,273 | 10/1958 | Beber et al. | 422/145 |
| 3,009,781 | 11/1961 | Johnson et al. | 422/139 X |
| 3,552,932 | 1/1971 | Badham | 422/145 X |

Primary Examiner—Curtis R. Davis
Assistant Examiner—William L. Diemler
Attorney, Agent, or Firm—Alexander J. McKillop; Charles J. Speciale; Dennis P. Santini

[57] ABSTRACT

A device for delivering solid particulates is disclosed. The particulate delivery system can be used to deliver a small quantity of solids to a laboratory and/or pilot plant scale fluid-catalytic cracking (FCC) device which may be operated on a semi-continuous or continuous program.

22 Claims, 3 Drawing Sheets

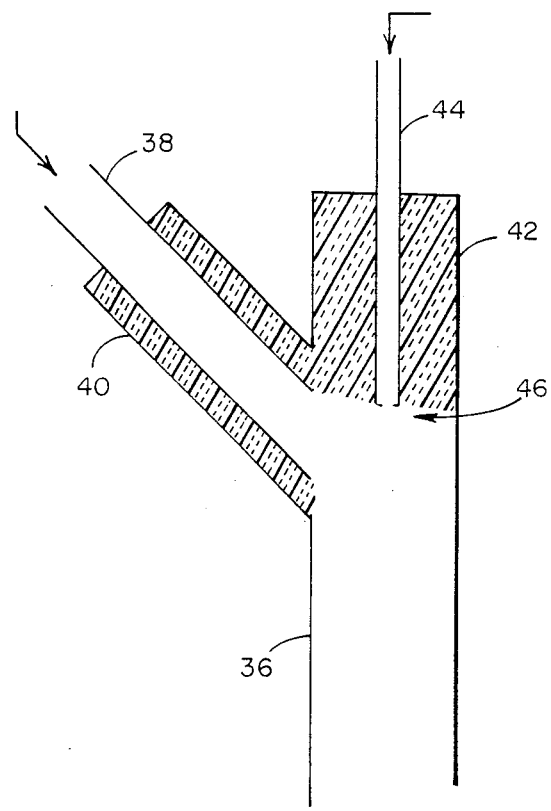
FIG. 4
FIG. 5
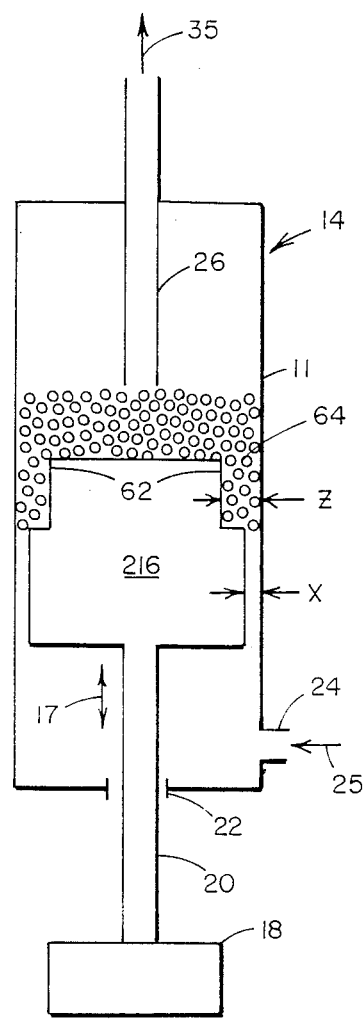

LABORATORY FCC RISER AND PARTICULATE DELIVERY SYSTEM THEREFOR

BACKGROUND OF THE INVENTION

The field of catalytic cracking and particularly fluid catalyst operations have undergone significant development improvements due primarily to advances in catalyst technology and product distribution obtained therefrom. With the advent of high activity catalysts and particularly crystalline zeolite cracking catalysts, new areas of operating technology have been encountered requiring even further refinements in processing techniques to take advantage of the high catalyst activity, selectivity and operating sensitivity.

Commercial fluid catalyst processes utilize catalysts flow on the order of tons per hour through standpipes which are flow regulated by restrictive slide valves. Thus, although commercial fluid catalytic cracking (hereinafter FCC) processes and apparatus are generally well known throughout the industry, current and future research into novel catalysts compositions and/or modifications of existing compositions necessitate the testing of such compositions at laboratory and/or pilot plant scales before bulk production of the catalyst and commercial FCC operation commence.

The present invention is therefore concerned with the physical and chemical process of hydrocarbon conversion utilizing a solid particulate catalyst at laboratory and/or pilot plan scale. In a particular aspect of the present invention a solid particulate delivery system is disclosed for delivering small amounts of a solid particulate material under controlled conditions.

DESCRIPTION OF THE PRIOR ART

Commercial scale FCC processes are well known in the prior art as evidenced by numerous patent and technical publications. One such process is described in U.S. Pat. No. 4,368,114, the disclosure of which, in its entirety, is herein incorporated by reference.

However, development of novel catalysts and/or modifications of existing catalysts necessitates the testing of the properties and effects of the catalyst on an FCC process before development of bulk quantities of the catalyst or commercialization of the process.

Laboratory testing techniques of FCC catalysts have been heretofore limited to testing of the catalyst in fixed or fixed-fluidized bed reactors. Exemplary of such a reactor is reported in *Kinetics and Dynamics of Catalytic Cracking Selectivity in Fixed-Bed Reactors*, V. W. Weekman, Jr., I & EC Process Design and Development, Vol. 8, No. 3, July 1969, pp. 385-391, the disclosure of which, in its entirety, is herein incorporated by reference.

When an FCC catalyst is run in such a reactor the catalyst continually deactivates due to coking, such that the product yields change throughout the run. Thus, these are transient reactors, rather than steady state reactors.

Pilot scale continuous FCC units typically require several kilograms of catalyst. A once-through unit has been described in *Artificially Metals-Poisoned Fluid Catalysts Performance in Pilot Plant Cracking of Hydrotreated Resid*, E. Thomas Habib, Jr. et al, Ind. Eng. Chem., Prod. Res. Dev., Vol. 16, No. 4, 1977, pp. 291-296, and a continuous unit is described in *Arco's Updated Cat-Cracking Pilot Unit*, W. H. Humes, CEP, February, 1983 pp. 51-54, the entire disclosure of each of which is herein incorporated by reference. These units also employ over a kilogram of catalyst for operation. Hence, they are not suitable for use for testing novel catalysts which are not available in large quantities.

The problem of delivering small quantities of solid particulate matter, such as catalyst particles, in a uniform manner have not been satisfactorily addressed by any of the aforementioned prior art.

SUMMARY OF THE INVENTION

The present invention relates to the conversion of hydrocarbon feed materials in the presence of high activity fluidizable crystalline zeolite containing catalyst particles. In a more particular aspect, the present invention is concerned with a method and system for delivering a small amount of solid particulate matter at a controlled rate. In yet another aspect, the invention is concerned with a method and apparatus for testing and evaluating a catalyst at laboratory and/or pilot plant scale.

In one aspect of the hydrocarbon conversion system of the present invention a relatively small amount of solid particulate matter having catalytic activity is metered from a source of such particles, fluidized, and mixed with a hydrocarbon feedstock. The mixture of fluidized solid particulate and hydrocarbon is fed through a reactor at catalytic cracking conditions to form hydrocarbon conversion products. The mixture of partially spent catalyst, conversion products, and unconverted hydrocarbon is optionally quenched and fed to a stripper wherein the solid particulate is removed from the products and unconverted hydrocarbons. The solid particulate is stripped of residual products and unconverted hydrocarbon by subjecting the solid particulate to a stripping gas, for example, nitrogen or steam, and the products and unconverted hydrocarbons recovered from such stripping step. Optionally, the solid particulate may be recycled directly from the stripper through a control valve to the source of solid particles.

In a particularly preferred embodiment of the invention the solid particulate is delivered from a source of particulates by fluidization with a fluidizing gas, e.g., nitrogen or steam, which forces the particulates into a conveying conduit to be conveyed to and mixed with the hydrocarbon feedstock.

In a most particularly preferred embodiment of the invention, the source of solid particulate is contained within a cylinder, resting upon a piston movable within the cylinder. In a variation of the most particularly preferred embodiment, the piston is in the shape of a cup, having a closed bottom and an open top in which the solid particulate is contained. The fluidizing gas, e.g., nitrogen or steam, is introduced into the cylinder, on the opposite side of the piston from the mass of solid particulate and permitted to flow upwardly through a clearance between the piston and cylinder wall. Simultaneous with the introduction of the fluidizing gas, the piston is moved by suitable means toward an exit tube arranged at one end of the cylinder. The solid particulate, fluidized by the moving carrier fluid and conveyed by the movement of the piston exits from the cylinder through the exit tube.

In a second variation of the most particularly preferred embodiment of the invention the movable piston, in the shape of a cup having a closed bottom and an open top, is provided with a foraminous layer adjacent the closed bottom of the cup and a shaft which reciprocates the piston relative to the cylinder is provided with conduit means operatively connected to said foraminous bottom so that a fluid carrier may also be introduced through said conduit and the foraminous bottom so as to fluidize the solids within the cup.

It will be recognized from the above discussion that the disclosed invention can be modified in various ways such as by suitably sizing the varying parts of the apparatus and/or performing the process under various conditions of temperature, pressure, fluid flow and residence times so as to utilize the advantages of the invention in either laboratory and/or pilot plant operation.

It is also within the scope of the present invention to effect chemical conversions other than fluid-catalytic cracking. For example, by employing a catalyst which has been suitably modified and/or employing a catalyst having properties other than that of cracking, it may be possible to simultaneously dewax/hydrocrack, isomerize, hydrogenate/dehydrogenate, and perform other conversion operations upon the hydrocarbon feedstock.

The catalyst employed in the method and apparatus of the present invention may include known natural and synthetic catalytic materials. However, because it is a primary purpose of the invention to provide a method and apparatus to test novel and/or modified catalytic solids, the properties of which are as yet unknown, it may properly be stated that the method and apparatus are not limited to any particular catalytic material.

The spirit and scope of the invention will be better understood by reference to the following detailed description of the invention including reference to the appended drawings.

BRIEF DESCRIPTION OF THE DRAWINGS

FIG. 4 is a schematic view of a mixing section wherein the solid particulates are caused to come into contact with a hydrocarbon feedstock;

FIG. 5 is an enlarged view of an alternative particulate solids delivery system employing an alternative piston profile configuration.

DETAILED DESCRIPTION OF THE PREFERRED EMBODIMENTS

Figure 1:
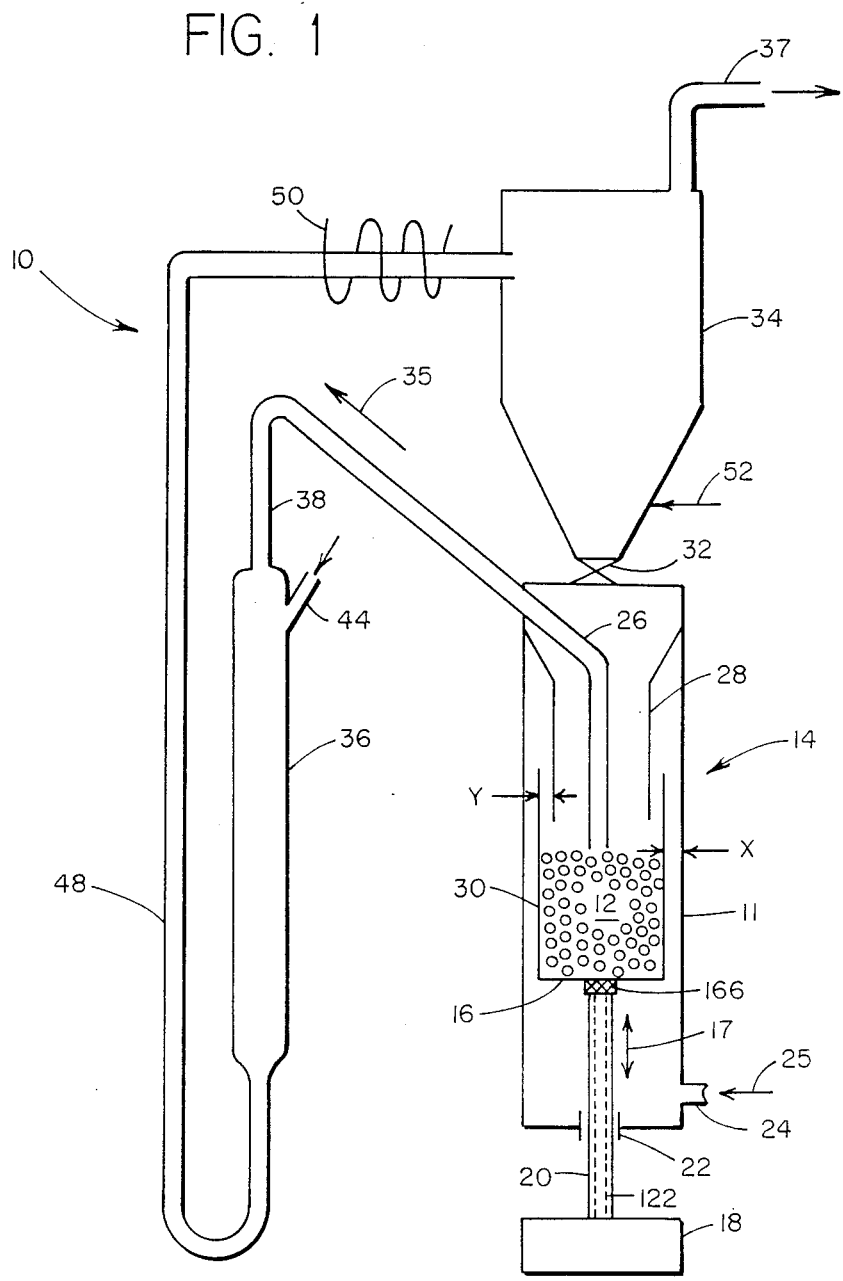
FIG. 1 is a schematic view of a laboratory and/or pilot plant model FCC riser according to the present invention.

Referring now to the drawings, a laboratory and/or pilot plant FCC riser system is generally illustrated at 10 in FIG. 1. A source of solid particulates 12 is maintained within a particulate solids delivery system 14 in which piston 16 is reciprocally movable along the directions of arrow 17 relative to cylinder 11. Means 18 of known hydraulic, pneumatic, mechanical or electrical construction are provided for reciprocating piston 16 by means of shaft 20 passing through opening 22 in cylinder 11. A seal means (not shown) can be provided in opening 22 so as to prevent loss of pressure between shaft 20 and the cylinder wall surrounding opening 22. Input means, such as conduit 24, are provided so that a carrier fluid, such as nitrogen or steam, may enter the lower portion of cylinder 11 in the direction of arrow 25. An exit tube 26 is provided in fluid communication within the space bounded by piston 16 and cylinder 11 so as to deliver fluidized solid particulates to a point where they will be mixed with a hydrocarbon feedstock. In a particularly preferred embodiment of the invention, piston 16 is provided with a cup-like extension 30 so as to further define the space within cylinder 11 in which the fluidized solid particulates may occupy. A suitable baffle 28 may be provided to prevent particles from splashing out of the cup in the event of vigorous fluidization. When used in combination with baffle 28, extension 30 is dimensioned so as to telescope with baffle 28. Although exaggerated in FIG. 1, it is to be understood that the clearance X between piston 16 and cylinder 11, as well as the clearance Y, between the cup-like extension 30 of piston 16 and baffles 28 are much smaller than actually shown. A manual or remotely controllable valve 32 permits return of partially spent catalyst from stripper 34 to the source of solid particulate 12. The fluidized particulates, exiting the particulate delivery system 14, via exit tube 26, travel in the direction of arrow 35 until they are mixed with the hydrocarbon feedstock introduced into reaction tube 36 from conduit 44. The details of the mixing apparatus will best be understood by reference to FIG. 4.

As illustrated in FIG. 4, the solid particulates enter reaction tube 36 via an extension of exit tube 26 identified as 38. The extension 38 may be provided with insulation 40 so as to prevent heat loss into the environment from the solid particulate, which are usually at elevated temperature $T_1$. An additional amount of insulation 42 is placed about conduit 44 through which the hydrocarbon feed is introduced into reaction tube 36. The particulate solids and hydrocarbon feedstock mix rapidly after they intersect. The hydrocarbon feed is usually also at an elevated temperature $T_2$ which may be the same or different from $T_1$. The elevated temperature $T_2$ of the hydrocarbon feedstock and the elevated temperature $T_1$ of the solid particulate are usually sufficient to cause a catalytic reaction immediately downstream of the orifice 46 of conduit 44 so that a mixing temperature $T_3$ is achieved shortly downstream of the point of mixing of the solid particulate and hydrocarbon feedstock.

In a preferred embodiment the contact of the hydrocarbon feedstock primarily with the walls of reactor tube 36 is minimized, so that the feedstock primarily contacts the solids, at elevated temperature, rather than the walls of the reactor tube. However, if necessary, additional heat may be supplied to the walls of reactor tube 36 by suitable means (not shown). The mixture of solids and hydrocarbons are swept through reactor tube 36 and through elongated riser 48. The mixture may optionally be quenched by means of heat exchanger 50 before exiting riser 48. Gaseous substituents may be separated from solids and other fluids by means of a cyclone, filter, settling chamber, or equivalent device (not shown) within stripper 34. Alternatively, a rapid quenching of the mixture exiting riser 48 may be effected by directly injecting a cooling fluid, such as flashed carbon dioxide, into the mixture in place of, or in addition to, the use of heat exchanger 50. This cooling fluid may also be separated by the aforementioned separation means. The method of cooling should be sufficient to reduce the temperature at the top of the riser 48, typically at about 950° F. to about 1200° F. to the stripper temperature which is about 900° F. to about 1000° F. Reaction products are recovered via conduit 37 with the particulate solids accumulating in stripper 34.

At the beginning of the reaction period, essentially all of the solids inventory is in the particulate solids delivery device 14. This inventory is depleted as the solids are delivered to the reactor tube 36. At the end of the reaction period, the solids are accumulated in a separation means. The solids in the separation means may be further treated as desired, for instance, in an FCC operation the solids can be stripped of residual hydrocarbons by purging the solids with an inert gas. Such inert gas may be steam or nitrogen introduced into the bottom of stripper 34 via conduit 52. Subsequent to such treatment, the solids may reenter the solids delivery system 14 via valve 32 by opening the same. It should be understood that valve 32 is normally closed during the reaction period and during subsequent processing of the catalyst such as stripping residual hydrocarbons therefrom. The valve 32 when opened allows solids to flow from stripper 34 to the solids delivery device 14 where the solids may undergo further treatment. In an FCC operation, the solids can be regenerated by burning off coke entrained within the solids. The means for effecting such regeneration can be a conventional heat source such as a gas or electrically heated furnace, an induction furnace, or a microwave device (not shown). After the solids are regenerated, the cycle is complete and a new reaction period can commence.

Figure 2:
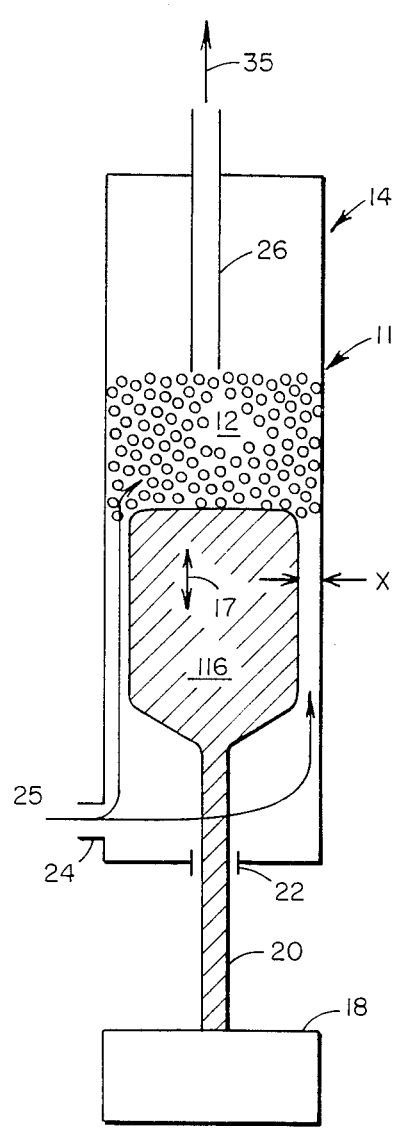
FIG. 2 is an enlarged view of the solid particulate delivery system of FIG. 1.

In FIG. 2 is shown an alternative piston configuration for solids delivery device 14. It is to be understood that the same reference numerals will be utilized through the drawing figures to designate similar elements. The source of solid particulate 12 resting upon piston 116, which is reciprocally movable in the directions indicated by arrow 17 by means of a driving device 18, forces the source 12 toward exit tube 26. A source of fluidizing gas, entering cylinder 11, through conduit 24 in the direction of arrow 25, flows through the clearance between the outer periphery of piston 116 and the inner cylindrical surface of cylinder 11. This source of fluidized gas fluidizes the particles, carrying the particles with it through exit tube 26 in the direction of arrow 35.

As shown in the alternative configuration of piston 216 in FIG. 5 the upper edges of piston 216 ar relieved at 62 so as to create a relatively lean zone 64 between the outer periphery of the upper edge of piston 216 and the inner periphery of cylinder 11. Typically, FCC particles having a particles size of about 70$\mu$ to about 150$\mu$ tend to be crushed when a piston arrangement is utilized as in FIG. 2 having a gap X of about 70$\mu$. It should be appreciated that the normal clearance X between the outer periphery of piston 116 and the inner circumference of cylinder 11 varies due to piston/cylinder misalignment and tolerances. Accordingly, some of the solid particles may fall into the gap. At high fluid flow rates the solids which fall into the gap are swept back up. However, at low flow rates the solids may become trapped in the gap and ground up as the piston 116 moves relative to cylinder 11. By relieving the upper edges of piston 216 so that the distance Z is on the order of about 250$\mu$ applicants have found that this configuration prevented the crushing of the solid particles in the lean zone 64 while at the same time preventing fewer solid particles from falling down into the gap represented by X. This arrangement represents a preferred embodiment over the single gap size as illustrated in FIG. 2.

Figure 3:
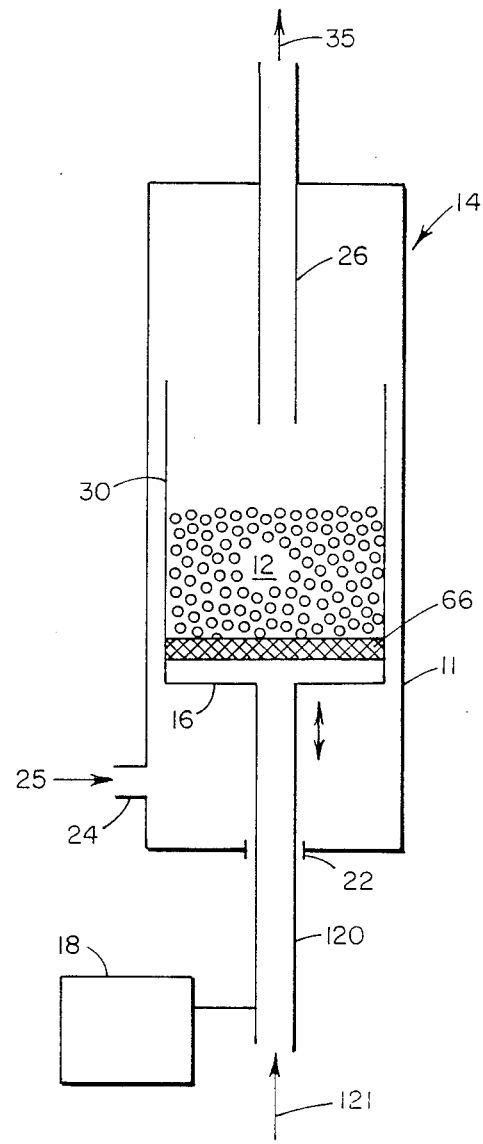
FIG. 3 is an enlarged view of an alternative embodiment of a particulate solids delivery system.

An alternative embodiment of the solids delivery device 14 is illustrated in FIG. 3. In FIG. 3 there is used the cup-like extensions 30 on piston 16 as in FIG. 1. However, shaft 20 of FIG. 1 is replaced by support tube 120 so that a source of pressurized fluid (not shown) can enter support tube 120, in the direction of arrow 121, to be distributed beneath the bed of solid particles 12 by means of a foraminous layer 66. The foraminous layer 66 may conveniently be formed of any porous material, i.e., a sintered glass frit or ceramic material, or a metal screen. Whatever the form of foraminous layer 66 it must be sufficiently porous to permit the pressurized fluid, conveyed through support tube 120, to assist in fluidizing the solids 12 and convey them through exit tube 26 in the direction of arrow 35. It is also to be understood that shaft 20 of FIG. 1 may also contain a fluid passage 122 therein upon the exit of which is placed a foraminous layer 166, constructed of the aforementioned materials suitable for foraminous layer 66 so as to assist in fluidizing the solid particulate within bed 12.

The aforementioned solids delivery devices can be used to deliver an supply of solids in very small amounts, i.e., less than 100 grams, which permits its utilization in the testing of catalysts for processes, such as fluid catalytic cracking, in which only small amounts of catalyst may be available. However, the invention also permits the utilization of the devices for pilot-plant scale. The solids delivery device heretofore described provides a steady flow of solids from a source 12 to the reactor tube without the necessity to use restriction slide valves as in commercial FCC units.

The utilization of fixed or fixed-fluidized bed reactors results in continual deactivation due to coking of the catalyst with the result that product yields change throughout the run. Because commercial FCC risers are moving-bed reactors, the present invention provides more realistic data for evaluating novel and/or modified catalysts than that obtained from a fixed or fixed-fluidized bed reactor.

Pilot scale continuous FCC units typically require several kilograms of catalysts. The apparatus described herein incorporates a true riser reactor, but requires less than 100 grams of catalyst to operate. This is particularly advantageous for testing novel catalysts which may not be available in large quantities and the overall scale of the apparatus is small so than it can be operated within the laboratory. A typical run utilizing the present invention could span around 20 reaction/regeneration cycles in order to accumulate sufficient cracked product for analysis. If less than about 5 grams of catalyst is used, non-ideal flow effects may lead to unreliable results. However, there is no clear upper limit on the amount of solids that can be accommodated by the apparatus of the present invention and a continuous pilot plant might, in some instances, be preferable in scale if the solids inventory is more than 1-2 kilograms.

The solids delivery system of the present invention is subject to suitable modification by those having ordinary skill in the art. For example, the relative movements described in connection with the bed of particulate solids, piston and cylinder can also be achieved by holding the particulate bed and piston stationary while the exit tube and cylinder are lowered relative to the bed. The fluid can flow up through the bed or across the top surface of bed on its way to the exit tube. Although smoother operation is usually obtained if the bed is fluidized by fluid flowing up through it, suitable control of the fluidizing gas, as well as the configuration of the various parts of the fluid delivery system will result in different operating parameters.

The invention will be useful in applications where well-controlled flow of solids is needed, particularly where the flow rate is small (less than 500 grams/minute) or when the solids are hot or under pressure. For instance, although the system can be incorporated into a laboratory-scale reactor, wherein catalyst particles are metered into a tube to contact a hydrocarbon feedstock, it is also within the scope of the present invention to dispense other solids as well as a liquid or dispersions, such as a foam with the device. Although the device is typically utilized to meter small flows of solids on the order of about 30 to about 300 grams/minute it is possible to provide solid flows lower than one gram/minute by suitably sizing and operating the device.

It is also within the scope of the present invention to provide two or more solids delivery devices, operating in parallel, so that one device might be serviced and/or loaded with fresh solids while the other device is utilized to meter solids to a downstream processing operation. Thus, the foregoing invention can be converted from a semi-continuous process to a continuous process by the use of two or more solids delivery devices operating in parallel. A port (not shown) can be provided in the solids delivery devices 14 for convenient loading/unloading of the solids to facilitate a continuous process.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and cope of the appended claims.

What is claimed is:

1. An apparatus for delivering a plurality of solid particulate matter comprising:
    a cylinder;
    a piston mounted so as to be reciprocally movably within said cylinder said piston being sized and shaped so as to define a clearance between itself and said cylinder;
    means for effecting relative reciprocal motion between said piston and cylinder;
    a source of solid particulate on one side of said piston;
    a source of pressurized fluid on a side of said piston opposite said one side;
    means to operatively connect the source of pressurized fluid to said one side of said piston so that said fluid flows through said clearance;
    an exit tube for conveying said solid particulate matter from said cylinder.

2. The apparatus of claim 1, including a shaft to connect said piston to said means for effecting relative reciprocal motion.

3. The apparatus of claim 2, wherein said shaft is provided with a conduit to place the source of solid particulate in communication with a source of pressurized fluid; and a foraminous layer between said conduit and said solid particulate.

4. The apparatus of claim 1, including a reaction tube in fluid communication with a downstream end of said exit tube and means for conveying a hydrocarbon feedstock to said reaction tube.

5. The apparatus of claim 4, including a riser in fluid communication with said reaction tube.

6. The apparatus of claim 4, including means to separate the solids from the hydrocarbon feedstock and products of reaction; said means to separate being in fluid communication with said reaction tube.

7. The apparatus of claim 6, including means to strip entrained liquid from said separated solids.

8. The apparatus of claim 6, including means to convey the separated solids to said source of solid particulate.

9. The apparatus of claim 3, wherein the piston has the shape of a cup having an open top to confine said source of solid particulate.

10. The apparatus of claim 9, wherein the cylinder is provided with a baffle surrounding the exit tube; said baffle sized and shaped so as to telescope within an inner periphery of said cup.

11. A method of delivering small quantities of solid particulate matter comprising:
    providing a source of solid particulate matter within a cylindrical space bounded by a piston;
    permitting a pressurized fluid to flow through a clearance between said piston and said cylindrical space to entrain at least some of the particulate matter in said flow;
    decreasing the size of the cylindrical space by relatively moving the piston through said space while maintaining said flow; and
    causing the pressurized fluid and entrained particles to exit the cylindrical space, wherein the solid particulate matter is a catalyst including the step of causing the particles exiting the cylindrical space to contact a hydrocarbon feedstock under catalytic cracking conditions.

12. The process of claim 11, including the step of recovering products and separating the solid catalyst from the unreacted hydrocarbon feedstock.

13. The process of claim 12, including the step of stripping entrained hydrocarbons from the separated catalyst.

14. The process of claim 12, including the step of conveying the separated catalyst to the cylindrical space.

15. The process of claim 11, including the step of conveying catalyst to the contacting step from at least two sources of particulate catalyst contained in at least two cylindrical spaces connected in parallel.

16. The process of claim 15, wherein the two sources of particulate catalyst are delivered sequentially.

17. The process of claim 11 wherein the source of solid particulate matter is less than about 1 kilogram.

18. The process of claim 11, including the additional step of fluidizing the particles by introducing a pressurized fluid through a foraminous portion of said piston.

19. An apparatus for conveying a plurality of solid particulate matter comprising:
    a cylinder;
    a piston mounted so as to be reciprocally movable within said cylinder, the piston having a particulate matter contacting side and an opposite side;
    the particulate matter contacting side of the piston having upstanding walls to confine the particulate matter;
    a conveying tube mounted in the cylinder, the conveying tube being sized and shaped so as to telescope within the upstanding walls of the piston during the reciprocation of the piston in the cylinder;

a source of pressurized fluid adjacent the opposite side of the piston; and means permitting passage of the pressurized fluid through the piston.

20. The apparatus of claim 19, wherein the means permitting passage of the pressurized fluid through the piston is a foraminous layer.

21. The apparatus of claim 19, including a baffle positioned in the cylinder, said baffle surrounding the conveying tube.

22. The apparatus of claim 21, wherein the baffle is sized and shaped so as to telescope within the upstanding walls of the piston.

* * * * *